May 31, 1966 YOSHIHIRO UEDA 3,253,856
REVOLVABLE MOTORCAR SEAT
Filed Dec. 5, 1963
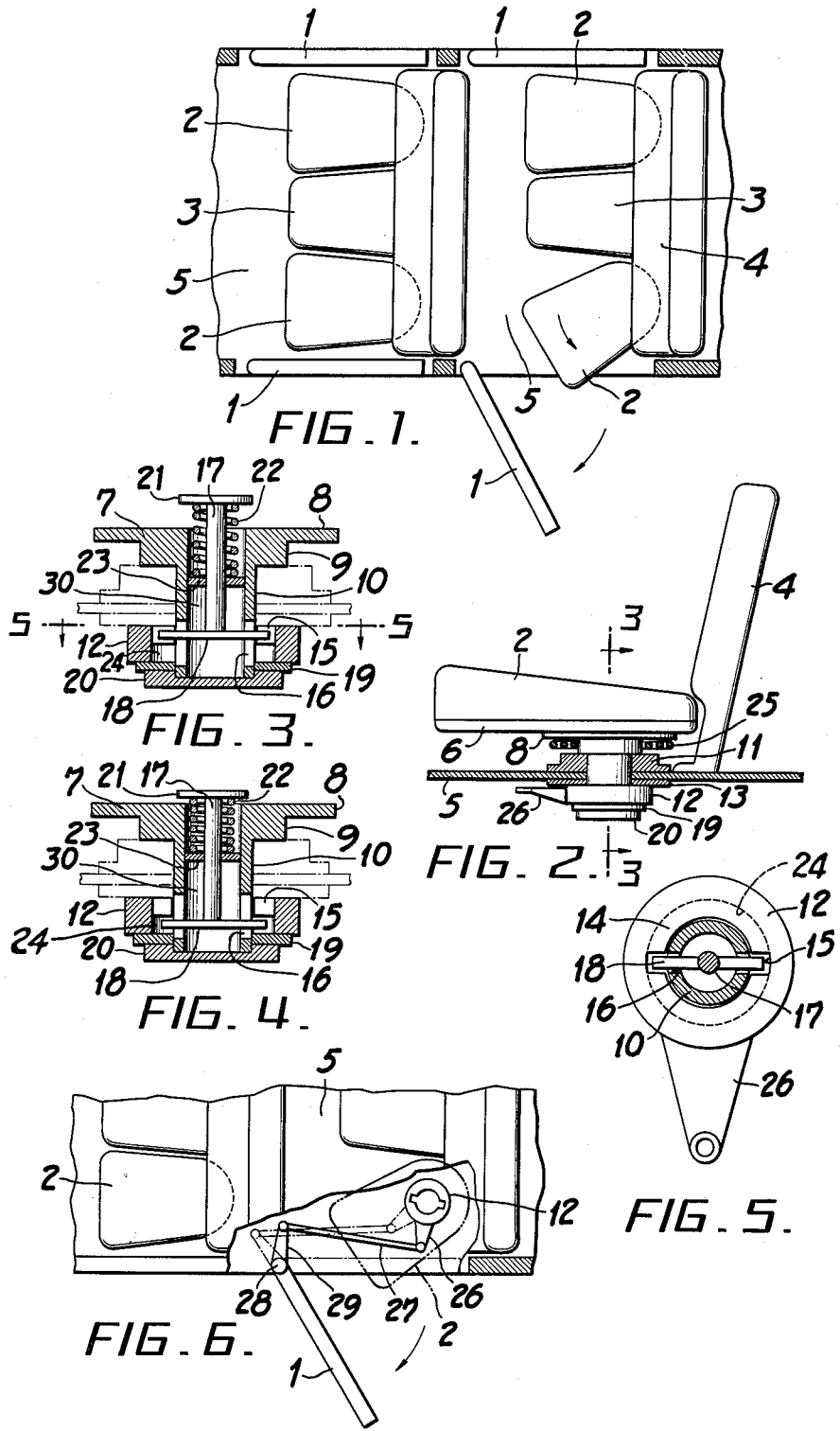

United States Patent Office 3,253,856
Patented May 31, 1966

3,253,856
REVOLVABLE MOTORCAR SEAT
Yoshihiro Ueda, 16 Maeda-machi, Ashiya-shi,
Hyogo-ken, Japan
Filed Dec. 5, 1963, Ser. No. 328,320
Claims priority, application Japan, Dec. 18, 1962,
37/57,379
4 Claims. (Cl. 296—68)

This invention relates to a motorcar seat, and more particularly to a seat which is horizontally revolvable in cooperation with the opening or closing of the door.

Conventional motorcar seats have adopted a fixed type although in some it is possible to adjust the inclination of the seat while in others the back cushion may be moved forward or backward. These are, however, not revolvable horizontally, so that as a consequence the passenger is required to stoop his body awkwardly to take a seat in the car or to leave it.

A primary object of this invention is to provide a motorcar seat which is revolvable, making it easy for the passenger to enter and leave the seat of the car.

Another object of this invention is to provide a motorcar seat near the door which is horizontally revolvable in cooperation with the opening or closing of the door, wherein said seat is independently movable without cooperation of the door when a passenger is seated.

A further object of this invention is to provide a motorcar seat wherein the revolvable seat is provided with a clutch device connected to the door through a linkage so that the seat can work with the door when unoccupied since the clutch is in engagement, whereas the seat will not do so when the seat is occupied since the clutch is disengaged.

These and other objects and advantages of this invention will become apparent in the following detailed description taken with reference to the accompanying drawings in which:

FIG. 1 is a fragmentary and diagrammatic plan view showing one embodiment of the invention;

FIG. 2 is a side elevation of the revolvable seat partly in section through a rotary shaft of the seat;

FIG. 3 is a sectional view taken on the line 3—3 of FIG. 2 showing a clutch in engagement;

FIG. 4 is a view similar to FIG. 3 showing a clutch out of engagement;

FIG. 5 is a sectional plan view taken on the line 5—5 of FIG. 3; and

FIG. 6 is a diagrammatic plan view showing interlocking means of a door and a revolvable seat.

Particularly in FIG. 1, this invention shows a device of a motor car comprising a chassis 5, an automatic or manual door 1, and a seat assembly, the seat assembly consisting of revolvable seats 2 adjacent to said door and revolvable horizontally on the chassis 5, a fixed seat 3 being disposed between the revolvable seats 2 and fitted on the chassis 5, and a back cushion 4 fixed on the chassis and on the back of said seats.

As shown in FIGS. 2 and 3, the revolvable seat 2 is provided with a back plate 6 secured on the underside of the seat. A hollow rotary shaft 7 for the revolvable seat has at its upper end a flange 8 fixed to said back plate 6. The hollow rotary shaft 7 has an enlarged portion 9 and a reduced portion 10, the latter being rotatably supported by bearings 11 fixed on the chassis 5. Between the chassis 5 and clutch member 12 is arranged a clamping plate 13 for the bearings. The clutch member 12 is of a cylindrical form and has at its upper surface an inwardly extended flange 14, on which latch fitting grooves 15 are formed diametrically. The reduced portion 10 of the hollow rotary shaft 7 has elongated grooves or notches 16 which extend axially in the lower part of shaft 7. A latch 18 is provided on the lower end of the latch shaft 17 and extends through the grooves 16 into the latch fitting grooves 15 formed on the flange 14. A bottom plate 19 for the clutch is rigidly fixed on the lower face of the clutch member 12. Also a cover 20 for a rotary shaft is fitted at the lower end of the hollow rotary shaft 7. The latch shaft 17 is provided with a receiving plate 21 to receive the weight of the passenger. A coil spring 22 is arranged between the receiving plate 21 and spring bearings 23 provided in the hollow part 30 of the hollow rotary shaft 7, so that the latch shaft 17 will normally be pressed upward by the spring 22. Accordingly, when the seat is not occupied by the passenger, the latch 18 of the latch shaft is engaged in the grooves 15 of the clutch member 12 whereby the rotary shaft is interlocked with the clutch member 12, whereas when the passenger is seated, the weight of the passenger presses down the latch shaft 17 against the spring 22 thereby disengaging the latch 18 from the grooves 15 to disengage the rotary shaft 7 from the clutch member.

A coil spring 25 is provided around the rotary shaft 7 between its flange part 8 and the bearings 11, one end of the spring 25 being fixed to the bearings 11 and the other end to the rotary shaft 7 acting always to revolve the revolvable seat in the outward direction relative to the car.

The clutch member 12 has an arm 26 on its periphery. One end of a connecting rod 27 is connected to the arm 26 and the other end is connected to an arm 29 fixed on the lower end of the rotary shaft 28 of the door 1.

When the seat is unoccupied, the latch shaft 17 is lifted upward by the spring 22 as shown in FIG. 3, the foremost ends of the latch 18 of the latch shaft 17 engaging the grooves 15 of the clutch member 12 to connect the rotary shaft 7 to the clutch member 12. Therefore, when the passenger opens the door 1, the revolvable seat 2 cooperates with the door 1 through the interlocking means as shown in FIG. 6, and the seat revolves horizontally in an outward direction to face the open door and the passenger. As the door 1 reaches its end position, the revolvable seat 2 too reaches its end position and permits seating of the passenger. As the passenger occupies seat 2, the latch shaft 17 is pressed down by the weight of the passenger against the action of the spring 22, the foremost ends of the latch 18 then being disengaged from grooves 15 and penetrating into the annular space 24 of the clutch member 12. As a consequence, engagement of the rotary shaft 7 and the clutch member 12 is released and the revolvable seat 2 is freed from the interlocking relation with the door 1. The passenger may revolve the seat 2 inward in the car while sitting on the seat 2. If another passenger is to take a seat following the previous passenger, the latter may take another seat in the car, and the revolvable seat 2, in like manner as illustrated in FIG. 2, will turn to the outward direction of the car by motion of the coil spring 25 and stop in correspondence with the door 1. The next passenger can therefore easily occupy a seat in the car similarly as the previous passenger.

While the passenger is seated, the latch shaft 17 is pressed down by the weight of the passenger as shown in FIG. 4 and the latch 18 of the latch shaft 17 is engaged in the annular space 24 of the clutch member 12. Therefore, the rotary shaft 7 and the clutch member 12 are released from engagement. When the passenger leaves the seat, the door 1 opens freely without cooperating with the revolvable seat 2. After the door opens the passenger may revolve the seat freely in the outward direction relative to the car while in sitting position and therefore can leave the seat very easily. After the passenger leaves the car and the revolvable seat 2 is not occupied, the latch 18 engages the grooves 15 of the clutch member 12, 2nd revolvable shaft 7 engages the clutch member 12 whereby the revolvable seat 2 cooperates with the door 1 through the interlocking device. Thus, by shutting the door 1, the revolvable seat 2 is rotated in the car automatically.

What I claim is:

1. Apparatus for use with a seat and a door of a vehicle, said apparatus comprising means rotatably supporting the seat adjacent the door of the vehicle, said means including a hollow rotary shaft secured to said seat and having a lower portion with elongated longitudinal grooves therein, a latch shaft displaceably supported in the hollow shaft and including a latch extending through the grooves in the rotary shaft, a clutch member surrounding the hollow shaft and having grooves for engaging the latch, said latch shaft having first and second positions in said hollow shaft, said latch engaging the grooves in the clutch member in one of said positions and being free of said grooves in the other of the positions, said clutch member being coupled to the hollow shaft for common rotation therewith with the latch engaged in the grooves in the clutch member, whereas said clutch member and hollow shaft are disengaged and free of relative rotation with the latch free of said grooves in the clutch member, and connection means connecting said clutch member and the door for common rotation.

2. Apparatus as claimed in claim 1, wherein said connection means comprises an arm on the clutch member, an arm on the door, and a connecting rod for connecting said arms.

3. Apparatus as claimed in claim 1, wherein said latch shaft includes a receiving plate for receiving the weight of the passenger, and a coil spring between said receiving plate and the hollow rotary shaft urging the receiving plate and the latch shaft to the position in which the latch is engaged in the grooves of the clutch member.

4. Apparatus as claimed in claim 1, comprising coil spring means around the rotary shaft and engaging the revolvable seat to urge the same in a direction to face the adjacent door.

References Cited by the Examiner

UNITED STATES PATENTS

| 794,276 | 7/1905 | Bolling | 108—142 |
| 1,666,392 | 4/1928 | Masury | 248—418 |
| 2,992,852 | 7/1961 | Loofbourrow et al. | 296—68 |
| 3,051,522 | 8/1962 | Myers | 296—68 |

FOREIGN PATENTS 306,860  7/1918  Germany.

BENJAMIN HERSH, *Primary Examiner.*

R. C. PODWIL, P. GOODMAN, *Assistant Examiners.*